Oct. 16, 1962   C. E. CHRISTOPHERSEN   3,058,761
SWIVEL JOINT HAVING A RESILIENT FLANGE
Filed July 2, 1958
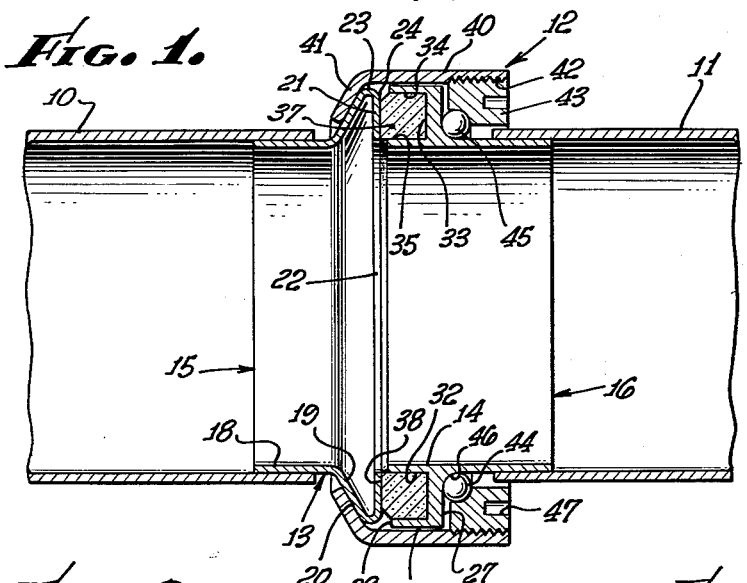
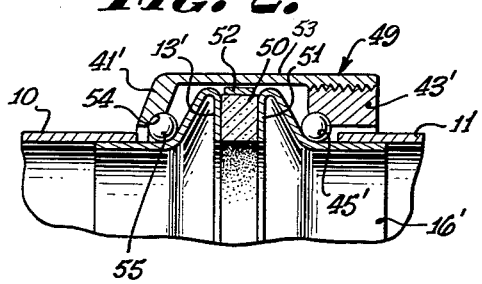
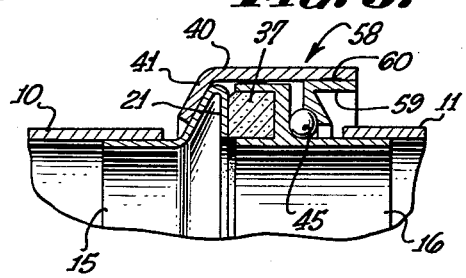
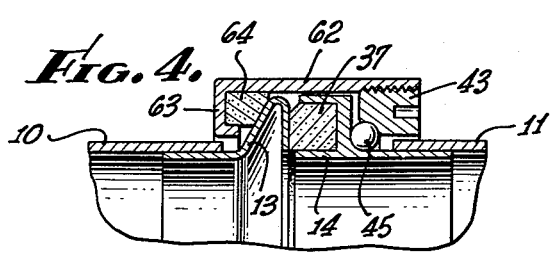
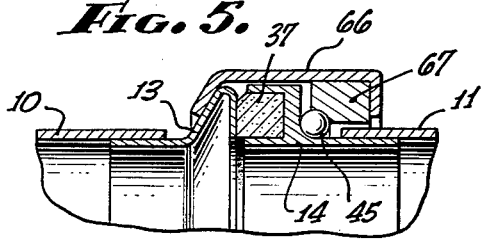
CLARENCE E. CHRISTOPHERSEN
INVENTOR.
BY Huebner & Worrel
ATTORNEYS 3,058,761
SWIVEL JOINT HAVING A RESILIENT FLANGE
Clarence E. Christophersen, Los Angeles, Calif., assignor to Aeroquip Corporation, Jackson, Mich., a corporation of Michigan
Filed July 2, 1958, Ser. No. 746,192
4 Claims. (Cl. 285—231)

This invention relates to tubing joints and more particularly to a joint for two tube sections which are arranged in axially aligned, end toward end relationship, the joint permitting relative rotation between the tube sections.

It is a general object of this invention to provide an improved rotation joint which is relatively simple, rugged and efficient in construction, easy to install, and reliable in service.

Further objects and advantages will appear during the course of the following part of this specification wherein the details of construction and mode of operation of several embodiments of the invention are described with reference to the accompanying drawing, in which:

FIG. 1 is a central longitudinal section through two tube sections which are coupled by a joint embodying this invention; and FIGS. 2, 3, 4 and 5 are fragmentary central longitudinal sections through second, third, fourth and fifth embodiments, respectively.

Referring to the drawing in detail, two axially aligned pipes or tube sections of a fluid line are shown and designated by numerals 10 and 11, respectively. They are interconnected in end toward end relationship by a joint designated, generally, by reference numeral 12. Tube section 10 has an integral, external annular end flange 13, and the other tube section has an integral, external annular end flange 14. It is preferred that the flanges be formed on the ends of adaptors which may be secured to the ends of the pipe sections. Thus, in the illustrated embodiments, end flange 13 of tube section 10 is formed on an adaptor 15 which is welded or otherwise suitably secured circumferentially in the end of tube 10, and an adaptor 16, having end flange 14, serves as an end portion for tube section 11.

End flange 13 is flared outwardly from a cylindrical portion 18 of adaptor 15 to provide a frusto-conical wall portion 19 having an outside surface 20 of the flange. A marginal portion 21 contiguous end edge 22 of the adaptor is bent at 23 to extend radially inwardly from the base of the frusto-conical wall portion 19 to define an annular side surface 24 of the flange. The annular surface 24 is preferably flat and disposed in a plane perpendicular to the axis of the pipe sections.

End flange 14 of pipe section 11 has an outside surface 27, an inside surface 28 and a circumferential end surface 29. The side faces 24 and 28 of flanges 13 and 14 are hereinafter referred to as being the near faces of the flanges, and the faces 20 and 27 are referred to as being the remote faces of the flanges.

Flange 14 has an annular groove 32 formed therein. The groove is preferably of channel section and opens in the near face 28 of the flange. The bottom wall of the channel groove is designated by reference numeral 33, and the side walls thereof by numerals 34 and 35. The flange mounts a seal ring 37 in groove 32 with the seal ring preferably being seated on the bottom wall of the groove. The seal ring projects outwardly beyond the face 28 of the flange to provide a flat annular sealing surface 38 in engagement with the annular face 24 of flange 13. The seal ring is solid and formed of a material having a low coefficient of friction with respect to the metal, e.g. steel, from which the flange 13 is formed.

With the joints of this invention relative rotation of the pipe sections with respect to each other on their long axes is permitted. It is along the interengaging surfaces of the seal ring and the flange 13 that sliding of one part on the other occurs. Should both sliding parts be formed of metal, galling of metal would occur on the surfaces or at least of the metal of one surface, whereby high friction would develop in the interengaging surfaces. According to this invention, the seal ring 37 may be formed of carbon or carbon and graphite compositions which are commercially available so as to provide a non-galling and low friction seal. Another preferred material from which the seal ring may be formed is one known as Teflon, which is readily available commercially. Carbon rings provide effective high temperature (750° F.) air sealing, while seal rings formed of Teflon are limited to uses at temperatures not greater than about 450° F. The coefficients of friction for rings formed of carbon with reference to polished steel are not greater than 0.12. Teflon has a coefficient of friction on polished steel of from 0.04 to 0.12. The carbon composition and Teflon, as well as ceramics, are furthermore characterized by a relatively low coefficient of thermal expansion and are herein referred to generically as being refractory materials.

Inasmuch as the refractory materials of the seal rings of this invention have low coefficients of thermal expansion, a ring may be secured in the end flange 14 by heating the flange and fitting the seal ring into the annular groove thereof. Upon cooling, the outer side wall 34 of the groove will contract radially inwardly and will tightly engage the side wall of the outside diameter of the seal ring, thereby to secure the seal ring fluid-tight within the groove.

End flange 13 being of V-shaped section and formed of a resilient material, its marginal portion 21 provides spring pressure loading against the seal ring. Furthermore, fluid pressure acting upon the inside walls of the V-shaped flange increases the pressure loading of the flange against the seal ring, thus to make the seal of the joint more tight against leakage.

In the embodiment shown in FIG. 1 the joint 12 comprises a sleeve 40 which surrounds the flanges. It has an inwardly bent end portion 41, the inside surface of which bears flush against the remote face of the flange 13. Its other end portion is internally screw-threaded at 42 to receive an annular nut 43. The nut 43 has an annular groove 44 formed therein which constitutes a race for a circumferentially arranged series of ball bearings 45. The other race for the balls is in the curved surface 46 along which the remote side of the flange 14 meets the outside cylindrical surface of its adaptor 16. There are holes 47 formed in the outside of the annular nut 43 for accommodating a prong wrench (not shown) to constrict the flanges toward each other whereby the sleeve and nut maintain the flanges under pressure in sealing engagement. It will be apparent that as the tube section 11 is rotated on its long axis with respect to tube section 10, the ball bearings 45 will roll within the races 44 and 46 and the seal ring will slide upon the annular surface of the flange 13.

A joint 49 embodying this invention and having a double bearing arrangement is shown in FIG. 2. The joint 49 differs further from that shown in FIG. 1 in that it comprises a seal ring 50 of a floating type positioned between two end flanges 13' and 51 each of which is similar to the end flange 13 shown in FIG. 1. The seal ring 50 has a metal band 52 which is shrunk tight around the outside circumference thereof. There is a cylindrical sleeve 53 which surrounds the flanges. The sleeve has an annular nut 43' screw-threaded within one end thereof for engagement with ball bearings 45' similarly as in the embodiment shown in FIG. 1. At its other end the sleeve 53 has an inwardly extending end portion 41′ having an annular groove 54 formed in the inside rim thereof as a race for accommodating a circumferentially arranged series of ball bearings 55. The other race for the balls 55 is that of the curved surface along which the remote side of flange 13′ meets the outside cylindrical surface of its adaptor 16′. It will be understood, of course, that an annular nut similar to that of 43′ may be used in the place of the inwardly extending flange end portion 41′.

Referring to FIG. 3, there is another embodiment of the joint, it being designated, generally, by reference numeral 58. It differs in structure from the joint 12 of FIG. 1, in that the annular nut 59 of joint 58 is of angle iron section whereby the same may be welded as at 60 to the inside surface of joint sleeve.

The embodiment shown in FIG. 4 has a sleeve 62, one end portion of which comprises an inwardly extending annular flange 63 serving to receive a seal ring 64 which slidably bears against the remote side of the end flange 13.

In FIG. 5 there is a sleeve 66, the end marginal portions of which are spun inwardly, one against the remote side of flange 13 and the other against the outside surface of an annular nut 67.

While the instant invention has been shown and described herein, in what are conceived to be the most practical and preferred embodiments, it is recognized that departures may be made therefrom within the scope of the invention, which is therefore not to be limited to the details disclosed herein, but is to be accorded the full scope of the claims.

What I claim is:
1. A rotation joint comprising two tube sections arranged in axially aligned end toward end relationship, said tube sections having respective first and second external annular end flanges, each flange having an annular near side surface which faces toward the near surface of the other flange, the flanges having respective remote annular side surfaces, said first flange being of resilient material and comprising two annular wall portions integral with each other along their outer circumferences and being spaced apart axially of the joint whereby said first flange is open to the inside of the tube sections, one wall portion extending from the other wall portion substantially in a radial plane of the joint to constitute the near surface of said one wall portion as a first annular bearing surface for the joint, the near surface of said second flange comprising a second annular bearing surface for the joint, a seal ring positioned between and in engagement with said first and second annular bearing surfaces for sliding sealing engagement with said bearing surfaces, the ring being formed of refractory material having a coefficient of friction with respect to the material from which said first flange is formed which is less than the coefficient of friction of said flange material with respect to said flange material, and means surrounding said flanges and urging said ring against said resilient first flange for maintaining said ring in slidable engagement with said first bearing surface, said means being in engagement with said remote surfaces and being freely rotatable on the axis of the tube sections with respect to one of said remote surfaces.

2. A rotation joint as defined in claim 1 wherein said means comprises a sleeve spanning the two flanges and having end portions which extend radially inwardly adjacent to the remote sides of the flanges, and a circumferentially arranged series of roller bearings between one of said sleeve end portions and the remote side of the respective flange.

3. A rotation joint as defined in claim 1 wherein said near surface of said second flange has an annular groove formed therein facing axially of the tube sections toward said first flange, said seal ring being secured in said groove.

4. A rotation joint as defined in claim 3 wherein said means comprises a sleeve spanning the two flanges and having one end portion which extends radially inwardly to engage the remote side of said first flange, an annular nut secured within the other end portion of the sleeve, and a circumferentially arranged series of roller bearings between the nut and said second flange.

References Cited in the file of this patent

UNITED STATES PATENTS

| | | |
|---|---|---|
| 874,652 | Bailey | Dec. 24, 1907 |
| 1,012,398 | McCombie | Dec. 19, 1911 |
| 1,758,869 | Trageser | May 13, 1930 |
| 1,930,833 | Barrett | Oct. 17, 1933 |
| 2,064,585 | Atienza | Dec. 17, 1936 |
| 2,459,389 | Newman | Jan. 18, 1949 |
| 2,462,006 | Schmitter | Feb. 15, 1949 |
| 2,548,216 | Houghton | Apr. 10, 1951 |
| 2,749,193 | Traub | June 5, 1956 |
| 2,793,058 | Jacobson | May 21, 1957 |
| 2,817,543 | Corsete | Dec. 24, 1957 |
| 2,937,893 | Hill et al. | May 24, 1960 |

FOREIGN PATENTS

| | | |
|---|---|---|
| 207,372 | Great Britain | Nov. 29, 1923 |
| 143,095 | Switzerland | Jan. 16, 1931 |